(12) United States Patent
Koo et al.

(10) Patent No.: US 12,157,343 B2
(45) Date of Patent: Dec. 3, 2024

(54) DRIVING ROBOT DEVICE

(71) Applicant: SAMSUNG ELECTRONICS CO., LTD., Suwon-si (KR)

(72) Inventors: Donghan Koo, Suwon-si (KR); Sanghyun Kang, Suwon-si (KR); Hyunsuk Kwak, Suwon-si (KR); Minhee Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 259 days.

(21) Appl. No.: 17/752,528

(22) Filed: May 24, 2022

(65) Prior Publication Data

US 2022/0410649 A1    Dec. 29, 2022

Related U.S. Application Data

(63) Continuation of application No. PCT/KR2022/005937, filed on Apr. 26, 2022.

(30) Foreign Application Priority Data

Jun. 25, 2021 (KR) .................. 10-2021-0083210
Nov. 19, 2021 (KR) .................. 10-2021-0160728

(51) Int. Cl.
*B60G 21/05* (2006.01)
*B60G 7/00* (2006.01)
(Continued)

(52) U.S. Cl.
CPC .......... *B60G 21/053* (2013.01); *B60G 7/001* (2013.01); *B60G 11/36* (2013.01); *G05D 1/0223* (2013.01);
(Continued)

(58) Field of Classification Search
CPC .... G05D 1/0223; G05D 1/027; G05D 1/0274; F16H 25/22; B60G 1/00; B60G 11/36;
(Continued)

(56) References Cited

U.S. PATENT DOCUMENTS 4,993,912 A * 2/1991 King ..................... B62D 61/12
                                                89/929
6,108,597 A * 8/2000 Kirchner .................. E03F 7/12
                                                701/25
(Continued)

FOREIGN PATENT DOCUMENTS

CN      111361380 A      7/2020
JP      201039839 A      2/2010
(Continued)

OTHER PUBLICATIONS

Shin KG Ramanathan P Jan. 1994 Real-time computing Proceedings of the IEEE (Year: 1994).*
(Continued)

*Primary Examiner* — Carl C Staubach
(74) *Attorney, Agent, or Firm* — Sughrue Mion, PLLC

(57) ABSTRACT

A driving robot device is provided. The driving robot device may include a plurality of suspensions configured to absorb a shock applied by a driving surface on which the driving robot device drives; a first driving part that includes a motor and is configured to adjust a strength of the plurality of suspensions; and at least one processor configured to control the first driving part to adjust the strength of the plurality of suspensions based on driving surface information with respect to a state of driving surface, and based on food information with respect to a state of food carried by the driving robot device.

19 Claims, 14 Drawing Sheets

(51) Int. Cl.
    *B60G 11/36*    (2006.01)
    *G05D 1/00*    (2006.01)

(52) U.S. Cl.
    CPC ........... *G05D 1/027* (2013.01); *G05D 1/0274* (2013.01); *B60G 2204/62* (2013.01); *B60G 2400/821* (2013.01); *B60G 2600/21* (2013.01); *B60G 2800/019* (2013.01)

(58) Field of Classification Search
    CPC .............. B60G 21/053; B60G 2204/62; B60G 2400/821; B60G 2600/21; B60G 2800/019; B60G 7/001; B60B 33/045; B60B 33/066
    See application file for complete search history.

(56) References Cited

U.S. PATENT DOCUMENTS

| | | | |
|---|---|---|---|
| 9,687,132 B2* | 6/2017 | Schlischka | A47L 9/009 |
| 10,618,401 B2* | 4/2020 | Lord | B60K 7/00 |
| 11,454,981 B1* | 9/2022 | Ebrahimi Afrouzi | G01C 21/20 |
| 2012/0049482 A1 | 3/2012 | Lizot et al. | |
| 2019/0016188 A1* | 1/2019 | Hachisuka | B60G 17/016 |
| 2019/0039428 A1* | 2/2019 | Ebrahimi Afrouzi | B60G 3/145 |
| 2020/0290208 A1* | 9/2020 | Ha | G05D 1/0246 |
| 2021/0061042 A1* | 3/2021 | Kim | B60G 17/02 |
| 2021/0139065 A1* | 5/2021 | Ha | A47B 31/00 |
| 2021/0170570 A1* | 6/2021 | Lee | B25J 19/0054 |
| 2021/0283965 A1* | 9/2021 | Isono | B60G 5/01 |
| 2021/0341937 A1* | 11/2021 | Park | G05D 1/0891 |
| 2021/0365041 A1* | 11/2021 | Lee | B25J 9/16 |
| 2022/0035373 A1* | 2/2022 | Inamoto | G05D 1/0274 |
| 2022/0153078 A1* | 5/2022 | Park | B60G 13/005 |
| 2022/0176765 A1* | 6/2022 | Gao | B60G 3/20 |
| 2022/0258818 A1* | 8/2022 | Yang | B25J 5/00 |
| 2022/0266933 A1* | 8/2022 | Kim | B62D 57/028 |
| 2022/0408944 A1* | 12/2022 | Lee | B25J 11/00 |
| 2022/0410649 A1* | 12/2022 | Koo | G05D 1/0274 |
| 2023/0084455 A1* | 3/2023 | Kang | B25J 5/007 701/23 |
| 2023/0115421 A1* | 4/2023 | He | G05D 1/0278 |
| 2023/0168679 A1* | 6/2023 | Brooks | B62B 5/0069 701/26 |
| 2023/0324923 A1* | 10/2023 | Lee | G01S 17/89 |
| 2024/0058968 A1* | 2/2024 | Farhat | G05D 1/027 |

FOREIGN PATENT DOCUMENTS

| | | |
|---|---|---|
| JP | 2011167798 A | 9/2011 |
| JP | 2012-152476 A | 8/2012 |
| JP | 2016-16321 A | 2/2016 |
| KR | 10-2006-0057256 A | 5/2006 |
| KR | 10-0711972 B1 | 5/2007 |
| KR | 10-2008-0004930 A | 1/2008 |
| KR | 10-0824315 B1 | 4/2008 |
| KR | 10-1847197 B1 | 4/2018 |
| KR | 1020190001456 A | 1/2019 |
| KR | 1020200134141 A | 12/2020 |
| KR | 1020210064015 A | 6/2021 |
| WO | 2020/071296 A1 | 4/2020 |

OTHER PUBLICATIONS

International Search Report issued Aug. 16, 2022 by the International Searching Authority in International Application No. PCT/KR2022/005937.

Written Opinion issued Aug. 16, 2022 by the International Searching Authority in International Application No. PCT/KR2022/005937.

* cited by examiner

FIG. 10

|    | K0  | K1  | K2  |
|----|-----|-----|-----|
| G0 | 150 | 130 | 110 |
| G1 | 100 | 80  | 60  |
| G2 | 50  | 30  | 10  |

LT ↓

DRIVING ROBOT DEVICE

CROSS-REFERENCE TO RELATED APPLICATIONS

This application is a bypass continuation of International Application No. PCT/KR2022/005937, filed on Apr. 26, 2022, which is based on and claims priority to Korean Patent Application No. 10-2021-0083210, filed on Jun. 25, 2021, and priority to Korean Patent Application No. 10-2021-0160728, filed on Nov. 19, 2021, in the Korean Intellectual Property Office, the disclosures of which are incorporated by reference herein in their entireties.

BACKGROUND

The disclosure relates to a driving robot device, and more particularly, to a driving robot device which includes a suspension that can absorb a shock applied to the driving robot device by the state of the driving surface during driving, and that enables the driving robot device to drive stably.

Recently, various driving robot devices that perform tasks in place of humans on industrial sites, or fields such as medicine, space, housework, etc. are being developed.

A driving robot device of the related art can travel along not only a flat plane, but also a surface having bumps or faults. For absorbing a shock applied to the driving robot device due to bumps or faults, and for ensuring stable driving, the driving robot device includes a suspension.

Such a suspension of a driving robot device may exert influence on driving according to the degree of strength. For example, if the strength of the suspension is low, there is an advantage that the driving robot device can stably pass along a driving surface wherein bumps or faults, etc. are formed as a shock absorbing operation is performed smoothly, but in contrast, there is also a disadvantage that the driving robot device is shaken severely before and after the driving direction due to inertia when accelerating or decelerating on a plane.

For complementing such a problem, it would be desirable to use an air suspension applied to luxury cars, etc., but in the case of applying an air suspension to a driving robot device which is compact, there are problems that the volume of the driving robot device increases, and the manufacturing cost increases greatly.

SUMMARY

The disclosure is for addressing the aforementioned need, and the purpose of the disclosure is in providing a driving robot device that can vary the strength of the suspension according to the state of the driving surface.

According to an aspect of the disclosure, a driving robot device includes: a plurality of suspensions configured to absorb a shock applied by a driving surface on which the driving robot device drives; a first driving part that includes a motor and is configured to adjust a strength of the plurality of suspensions; and at least one processor configured to control the first driving part to adjust the strength of the plurality of suspensions based on driving surface information with respect to a state of driving surface, and based on food information with respect to a state of food carried by the driving robot device.

The at least one processor may be further configured to: based on a state of the driving surface being determined as a plane, control the first driving part to adjust the strength of the plurality of suspensions to a first strength, and based on the state of the driving surface being determined as having at least one bump, control the first driving part to adjust the strength of the plurality of suspensions to a second strength that is lower than the first strength.

The driving robot device may further include: a plurality of driving wheels; and a second driving part that includes a motor and is configured to drive the plurality of driving wheels, wherein the at least one processor may be further configured to: based on the state of the driving surface being determined as the plane, control the second driving part such that the driving robot device drives at a first speed, and based on the state of the driving surface being determined as having the at least one bump, control the second driving part such that the driving robot device drives at a second speed that is slower than the first speed.

The at least one processor may be further configured to: based on the state of the food being determined to have a first fluidity, control the first driving part to adjust the strength of the plurality of suspensions to a first strength, and based on the state of the food being determined to have second fluidity that is higher than the first fluidity, control the first driving part to adjust the strength of the plurality of suspensions to a second strength that is lower than the first strength.

The driving robot device may further include: a plurality of driving wheels; and a second driving part that includes a motor and is configured to drive the plurality of driving wheels, wherein the at least one processor may be further configured to: based on the state of the food being determined to have the first fluidity, control the second driving part such that the driving robot device drives at a first speed, and based on the state of the food being determined to have the second fluidity, control the second driving part such that the driving robot device drives at a second speed that is slower than the first speed.

The driving robot device may further include: a memory storing mapping information with respect to an area wherein the driving robot device is configured to move, wherein the at least one processor may be further configured to determine the driving surface state based on the mapping information, and control the first driving part to adjust the strength of the plurality of suspensions based on the state of the driving surface.

The driving robot device may further include a plurality of driving wheels; and a second driving part that includes a motor and is configured to drive the plurality of driving wheels, wherein the at least one processor may be further configured to: determine the state of the driving surface, and control the second driving part to adjust a driving speed of the driving robot device based on the state of the driving surface.

The driving robot device may further include: a sensor configured to detect the state of the driving surface in real time, wherein the at least one processor may be further configured to control the first driving part to adjust the strength of the plurality of suspensions based on the state of the driving surface detected by the sensor.

The sensor may be a tilt sensor.

The plurality of suspensions may include a first suspension and a second suspension that are provided on a lower side of a base plate of the driving robot device at an interval, and in parallel to each other, wherein each of the first suspension and the second suspension may include a center part and two side parts at opposite sides of the center part, respectively, the center part may be fixed to the base plate, wherein each of the two side parts may include a cantilever and a caster provided on a lower surface of the cantilever, and the at least one processor may be further configured to vary a supporting point of the cantilever of each of the two side parts of each of the first suspension and the second suspension by controlling driving of the first driving part.

The cantilever may have a plate shape.

The driving robot device may further include, for each of the first suspension and the second suspension, a first operating block configured to move along a first longitudinal direction of the cantilever of a first side part from among the two side parts based on driving of the first driving part, and operate as the supporting point of the cantilever of the first side part while moving along the first longitudinal direction.

The driving robot device may further include, for each of the first suspension and the second suspension, a second operating block configured to move along a second longitudinal direction of the cantilever of a second side part from among the two side parts based on driving of the first driving part, and operate as the supporting point of the cantilever of the second side part while moving along the second longitudinal direction.

The first driving part may further include: a first connector that connects the first operating block associated with the first suspension to the first operating block associated with the second suspension, wherein the first operating block associated with the first suspension and the first operating block associated with the second suspension are on a first side of the driving robot device; a second connector that connects the second operating block associated with the first suspension to the second operating block associated with the second suspension, wherein the second operating block associated with the first suspension and the second operating block associated with the second suspension are on a second side of the driving robot device that is opposite to the first side, and the second connector is arranged in parallel to the first connector, wherein the first connector and the second connector are configured to vary locations of the first operating block, associated with the first suspension and with the second suspension, and the second operating block, associated with the first suspension and with the second suspension, by moving the first operating block, associated with the first suspension and with the second suspension, and the second operating block, associated with the first suspension and with the second suspension, in respective directions towards and away from each other based on driving of the motor.

According to an aspect of the disclosure, a driving robot device includes: a base plate; a pair of driving wheels respectively connected to a left side and a right side of the base plate; a first suspension provided on a lower side of the base plate and including a first cantilever and a second cantilever at respective sides of the first suspension; a second suspension provided at the lower side of the base plate and including a third cantilever and a fourth cantilever at respective sides of the second suspension; a plurality of casters respectively provided on lower surfaces of the first suspension and the second suspension, to respectively correspond to the first cantilever, the second cantilever, the third cantilever, and the fourth cantilever; a plurality of operating blocks configured to move along a longitudinal direction of the first cantilever, the second cantilever, the third cantilever, and the fourth cantilever, respectively, and operate as a supporting point of the first cantilever, the second cantilever, the third cantilever, and the fourth cantilever, respectively; a driving part including a motor; a power transmitter configured to move the plurality of operating blocks respectively and simultaneously along the longitudinal direction of the first cantilever, the second cantilever, the third cantilever, and the fourth cantilever by transmitting driving power of the motor to the plurality of operating blocks; a plurality of shock absorbers that are respectively provided between upper surfaces of the first suspension and the second suspension and a lower surface of the base plate, to respectively correspond to the first cantilever, the second cantilever, the third cantilever, and the fourth cantilever; a memory storing mapping information including a driving surface state; and at least one processor configured to control the driving part to adjust a strength of the first suspension and the second suspension by varying the supporting point of the first cantilever, the second cantilever, the third cantilever, and the fourth cantilever, based on the mapping information.

According to various embodiments of the disclosure, a driving robot device may vary the strength of the front and rear suspensions according to the state of the driving surface, and thus there may be an advantage that stable driving is possible.

Also, according to various embodiments of the disclosure, a driving robot device may have advantages that its entire volume does not increase even if it includes suspension, and the manufacturing cost is cheap.

BRIEF DESCRIPTION OF DRAWINGS

The above and other aspects, features, and advantages of certain embodiments of the disclosure will be more apparent from the following description taken in conjunction with the accompanying drawings, in which:

FIG. 10 is a diagram illustrating an example of a lookup table indicating the strength of a suspension in consideration of the driving surface state and whether food is mounted;

DETAILED DESCRIPTION

The embodiments that will be described below are non-limiting examples for assisting understanding of the disclosure, and it should be understood that embodiments of the disclosure may be implemented while being modified in various forms. In explaining embodiments of the disclosure below, in case it is determined that detailed explanation of related known functions or components may unnecessarily confuse the gist of the disclosure, the detailed explanation and detailed illustration thereof will be omitted. Also, the accompanying drawings may not be illustrated in their actual scales, but some components may be illustrated in more enlarged sizes than their actual sizes, for promoting understanding of the disclosure.

As terms used in this specification and the claims, general terms were selected in consideration of the functions described in the disclosure. However, the terms may vary depending on the intention of those skilled in the art, legal or technical interpretation, emergence of new technologies, etc. Also, in some cases, there are terms that were arbitrarily designated by the applicant, and the meaning of such terms may be interpreted as defined in this specification, and if there is no specific definition of the terms, the terms may be interpreted based on the overall content of this specification and general technical knowledge in the art.

Also, in this specification, expressions such as "have," "may have," "include," "may include," "comprise," and "may comprise" should be construed as denoting that there are such characteristics (e.g., elements such as numerical values, functions, operations, and components), and the terms are not intended to exclude the existence of additional characteristics.

In addition, in this specification, elements for explanation of embodiments of the disclosure are described, and elements of the embodiments are not necessarily limited thereto. Accordingly, some elements may be changed or omitted, or other elements may be added. Also, elements may be arranged to be dispersed in devices independent from one another.

Hereinafter, embodiments of disclosure will be described in more detail with reference to the accompanying drawings.

Figure 1:
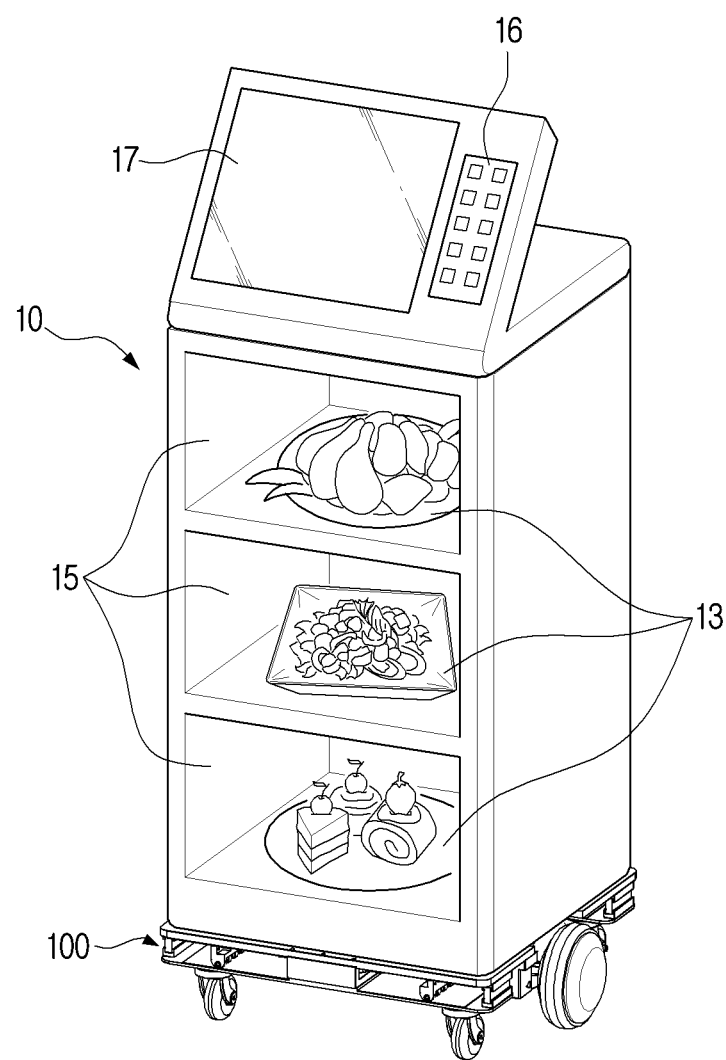
FIG. 1 is a diagram illustrating a driving robot device according to an embodiment of the disclosure.
Figure 2:
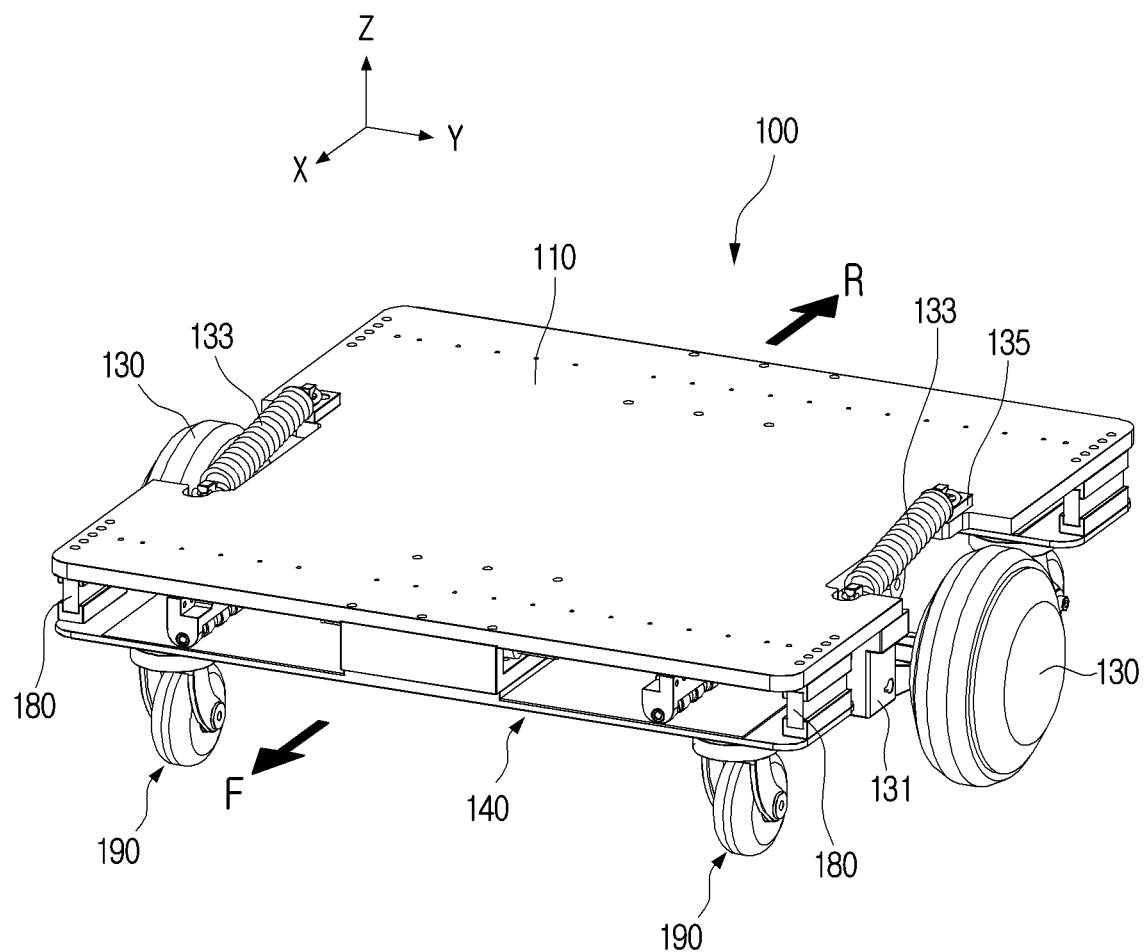
FIG. 2 is a diagram illustrating a driving part of a driving robot device according to an embodiment of the disclosure.
Figure 3:
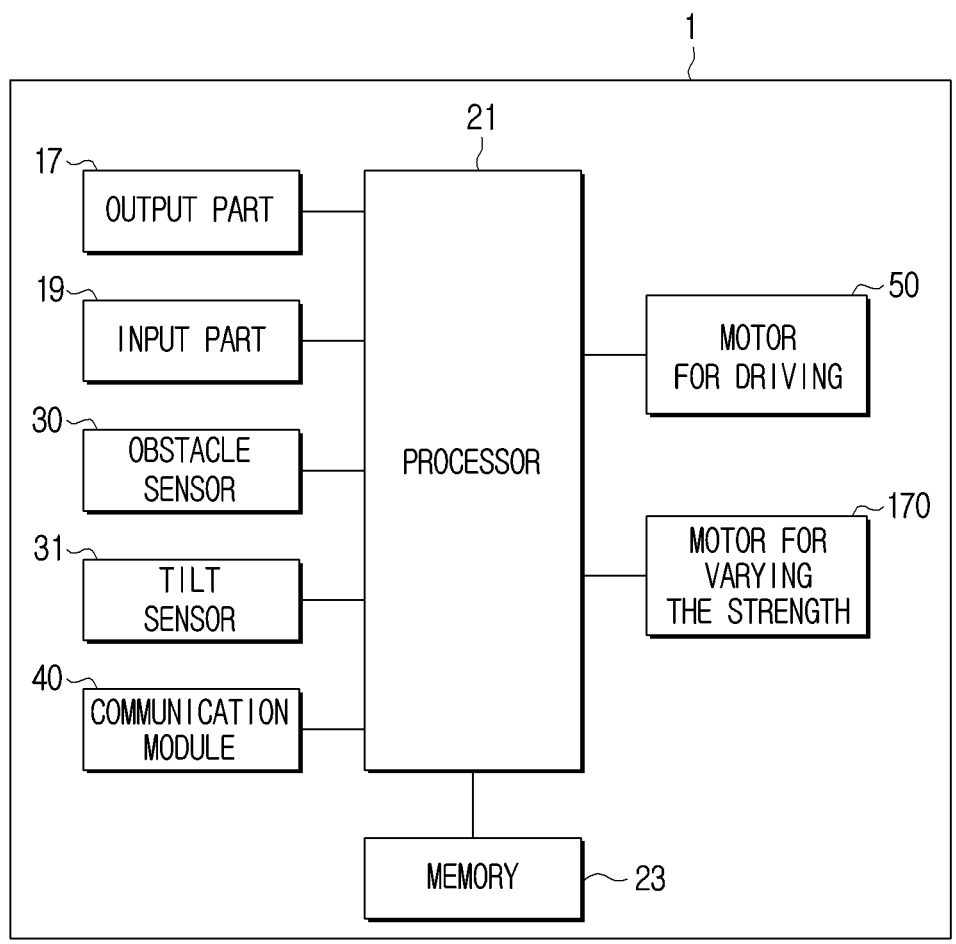
FIG. 3 is a block diagram illustrating a driving robot device according to an embodiment of the disclosure.

FIG. 1 is a diagram wherein an electronic device is mounted on a driving robot device according to an embodiment of the disclosure, FIG. 2 is a diagram illustrating a driving robot device according to an embodiment of the disclosure, and FIG. 3 is a block diagram illustrating a driving robot device according to an embodiment of the disclosure.

Referring to FIG. 1, a driving robot device 1 according to an embodiment of the disclosure may include a mounting part 10 that can provide various services, and a driving part 100 that can stably move the mounting part 10.

The mounting part 10 may include an appropriate structure that can serve food. However, the mounting part 10 is not limited to a structure for serving, and a structure that can provide services corresponding to at least one of cleaning, guide, patrol, or coping with emergency may be adopted.

Referring to FIG. 1, the mounting part 10 may include a plurality of racks 15 that can accommodate dishes 3, an input part 16, and an output part 17.

The input part 16 may be a keypad for inputting order information (e.g., a menu ordered by a customer) and serving information (e.g., at least one of dining tables arranged in a restaurant). The order information and the serving information input by the input part 16 may be stored in a memory 23 (refer to FIG. 3).

The output part 17 is not limited to a display panel that can only output information, but it may be constituted as a touch screen that can both output and input information. In case the output part 17 is constituted as a touch screen, order information and serving information may be input through the touch screen.

Referring to FIG. 2, the driving part 100 may include a base plate 110, a pair of driving wheels 130 respectively arranged on the left side and the right side of the base plate 110, a front suspension 140 and a rear suspension 150 (refer to FIG. 4) arranged in the front and the rear in the lower part of the base plate 110, and a plurality of casters 190 arranged in the lower part of each of the front suspension 140 and the rear suspension 150.

The base plate 110 may have a specific depth, and a plurality of screw holes may be provided so that the mounting part 10 can be installed on the upper surface.

The driving wheels 130 on the left side and the right side may respectively be arranged on the left side and the right side of the base plate 110. Each of the driving wheels 130 may be connected to be pivotable up and down to a supporting block 131 arranged on the lower surface of the base plate 110. In this case, each of the driving wheels 130 may be connected with a suspension 133 for driving wheels through the supporting block 131. As the suspension 133 for driving wheels, a coil spring may be used, and it may be arranged approximately along the forward direction F (refer to FIG. 2) and the reverse direction R (refer to FIG. 2) of the driving part 100. The suspension 133 for driving wheels may relieve shock applied to each of the driving wheels 130 from the driving surface during driving, and help stable driving of the driving part 100 together with the front suspension 140 and the rear suspension 150.

In this embodiment, explanation is made based on an example wherein the suspension 133 for driving wheels is a coil spring that operates in a horizontal direction, but embodiments of the disclosure are not limited thereto, and it is also possible to use a shock absorber operating in a vertical direction, or a coil spring arranged in a vertical direction, etc.

The front suspension 140 and the rear suspension 150 help the driving robot device 1 to drive stably by absorbing vibration and shock transmitted from the driving surface through the plurality of casters 190 arranged on their respective lower surfaces, and thereby preventing vibration and shock from being directly transmitted to the base plate 110 and the mounting part 10 installed on the upper surface of the base plate 110.

The front suspension 140 and the rear suspension 150 may be distanced at a specific interval with the pair of driving wheels 130 in between. The front suspension 140 and the rear suspension 150 will be described in detail below with reference to FIG. 4.

Figure 5:
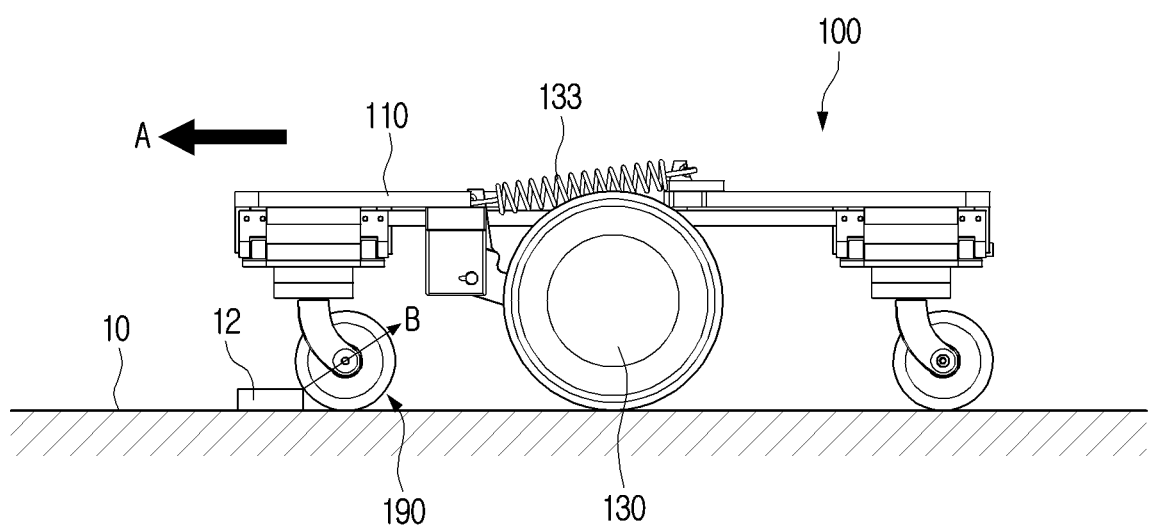
FIG. 5 is a diagram illustrating an example wherein a caster of a driving part collides with a step formed on a driving surface during driving.

The plurality of casters 190 help the driving of the driving robot device 1 while contacting the driving surface together with the pair of driving wheels 130 (refer to FIG. 5). Respective ones of the plurality of casters 190 may be arranged on the left side and the right side of the lower surface of the front suspension 140, and respective ones of the plurality of casters 190 may be arranged on the left side and the right side of the lower surface of the rear suspension

150. However, the number of the casters 190 arranged on the left side and the right side of each suspension is not limited, and the casters 190 may be installed appropriately in consideration of the size of the driving robot device 1.

Referring to FIG. 3, the driving robot device 1 according to an embodiment of the disclosure may include at least one processor 21, a memory 23, an obstacle sensor 30, a tilt sensor 31, a communication module 40, a motor 50 for driving, and a motor 170 for varying the strength.

The at least one processor 21 may control the motor 50 for driving based on mapping information with respect to the moving area of the driving robot device 1 stored in the memory 23. Accordingly, the at least one processor 21 may control the driving speed, the driving direction, the stoppage, etc. of the driving robot device 1.

The driving robot device 1 may directly generate mapping information while driving in the moving area (e.g., an area including the hall and the kitchen of a restaurant) before performing a serving activity. The mapping information may include map data acquired by a sensor provided in the driving robot device 1 (information on the driving surface state (e.g., the flatness, the gradient, whether there are steps or bumps), and location information of obstacles (e.g., a wall, a table, a chair, etc.)). According to embodiments, regarding the mapping information, the driving robot device 1 may not directly generate mapping information with respect to the moving area, but store mapping information produced in advance in the memory 23. The mapping information may be updated periodically or non-periodically by reflecting various changes such as the locations of the dining tables or the sizes of the dining tables in the hall of a restaurant, the locations of bumps and steps, etc. after the mapping information was produced initially.

Information that the driving surface state of a specific section has changed in the moving area of the driving robot device 1 (e.g., a part of a bottom of an object has been dented or a part of a carpet has been pushed and exposed), the chairs are not in their right positions, or a customer or a clerk is on the driving path of the driving robot device 1, etc. is not included in the mapping information generated in advance. For this, the driving robot device 1 according to an embodiment of the disclosure may include at least one sensor for recognizing the driving surface and obstacles in real time (e.g., a vision camera, a stereo camera, a LiDAR, or an RGB-D camera). The at least one processor 21 may control the motor 50 for driving and the motor 170 for varying the strength based on the obstacle information and the driving surface information acquired by the at least one sensor. Accordingly, the driving robot device 1 may respond regarding the driving speed, the driving direction, etc. in real time correspondingly to the changed driving surface state or locations of obstacles.

The at least one processor 21 may adjust the strength of the front suspension 140 and the rear suspension 150 by controlling the motor 170 for varying the strength during driving based on a lookup table LT (refer to FIG. 10) stored in the memory 23. Explanation in this regard will be made later with reference to FIG. 10.

The at least one processor 21 may control the motor 50 for driving and the motor 170 for varying the strength based on a tilt signal transmitted from the tilt sensor 31. For example, based on the tilt signal, the at least one processor 21 may control the driving speed of the driving robot device 1 and the strength of the front suspension 140 and the rear suspension 150 so that the food on a dish 13 accommodated in the mounting part 10 is not poured out or the dish 13 itself is not detached from the rack 15. As the tilt sensor 31, an inertia measurement unit (IMU) may be used.

The at least one processor 21 may control the driving speed, the driving direction, etc. of the driving robot device 1 based on a distance between the driving robot device 1 and an obstacle detected through the obstacle sensor 30. The obstacle sensor 30 may be provided in a form of an ultrasonic sensor or an infrared sensor that can recognize distances, but embodiments of the disclosure are not limited thereto. According to embodiments of the disclosure, the driving robot device 1 may control the driving speed, the driving direction, etc. of the driving robot device 1 based on a changed driving surface state, that was not included the mapping information, in real time by using the tilt sensor 31 and the obstacle sensor 30 while moving along a driving path, and vary the strength of the front suspension 140 and the rear suspension 150 by controlling the motor 170 for varying the strength. Accordingly, in embodiments of the disclosure, the driving robot device 1 can stably perform serving even in a state wherein the mapping information was not updated from the initial mapping information.

The memory 23 may store an operating system (OS) for controlling the overall operations of the components of the driving robot device 1, and instructions or data related to the components of the driving robot device 1.

Accordingly, the at least one processor 21 may control a plurality of hardware or software components of the driving robot device 1 by using various instructions or data, etc. stored in the memory 23, and load instructions or data received from at least one of the other components on a volatile memory and process them, and store various data in a non-volatile memory.

The memory 23 may store mapping information on an area wherein the driving robot device 1 drives. The mapping information may include the driving surface information (e.g., the type of the driving surface, the degree that bumps are distributed, etc.), the location information of a wall, the location information of a step (e.g., a door sill), etc.

The memory 23 may store a lookup table LT indicating the strength of suspensions corresponding to the driving surface state and whether food is mounted on the driving robot device 1 (refer to FIG. 10).

The communication module 40 may support establishment of a wireless communication channel with an external electronic device (e.g., a terminal device, a remote controller, or a server), and performing of communication through the established communication channel.

The communication module 40 may include a cellular communication module, a near field wireless communication module, or a global navigation satellite system (GNSS) communication module. A corresponding communication module among these communication modules may communicate with an external electronic device through a first network (e.g., a near field communication network such as Bluetooth, wireless fidelity (WiFi) direct, or infrared data association (IrDA)) or a second network (e.g., a long distance communication network such as a legacy cellular network, a 5G network, a next generation communication network, the Internet, or a computer network (e.g., a LAN or a WAN)). A wireless communication module may support the 5G network after the 4G network and a next generation communication technology, e.g., a new radio (NR) access technology. The NR access technology may support high speed transmission of high capacity data (enhanced mobile broadband (eMBB)), minimalization of terminal power and access of a plurality of terminals (massive machine type communications (mMTC)), or high reliability and low latency (ultra-reliable and low-latency communications (URLLC)).

The driving robot device 1 according to an embodiment of the disclosure may include a battery that is not illustrated in the drawings. Various kinds of components included in the driving robot device 1 may be provided with power from the battery. As the battery, a rechargeable battery may be used.

Figure 4:
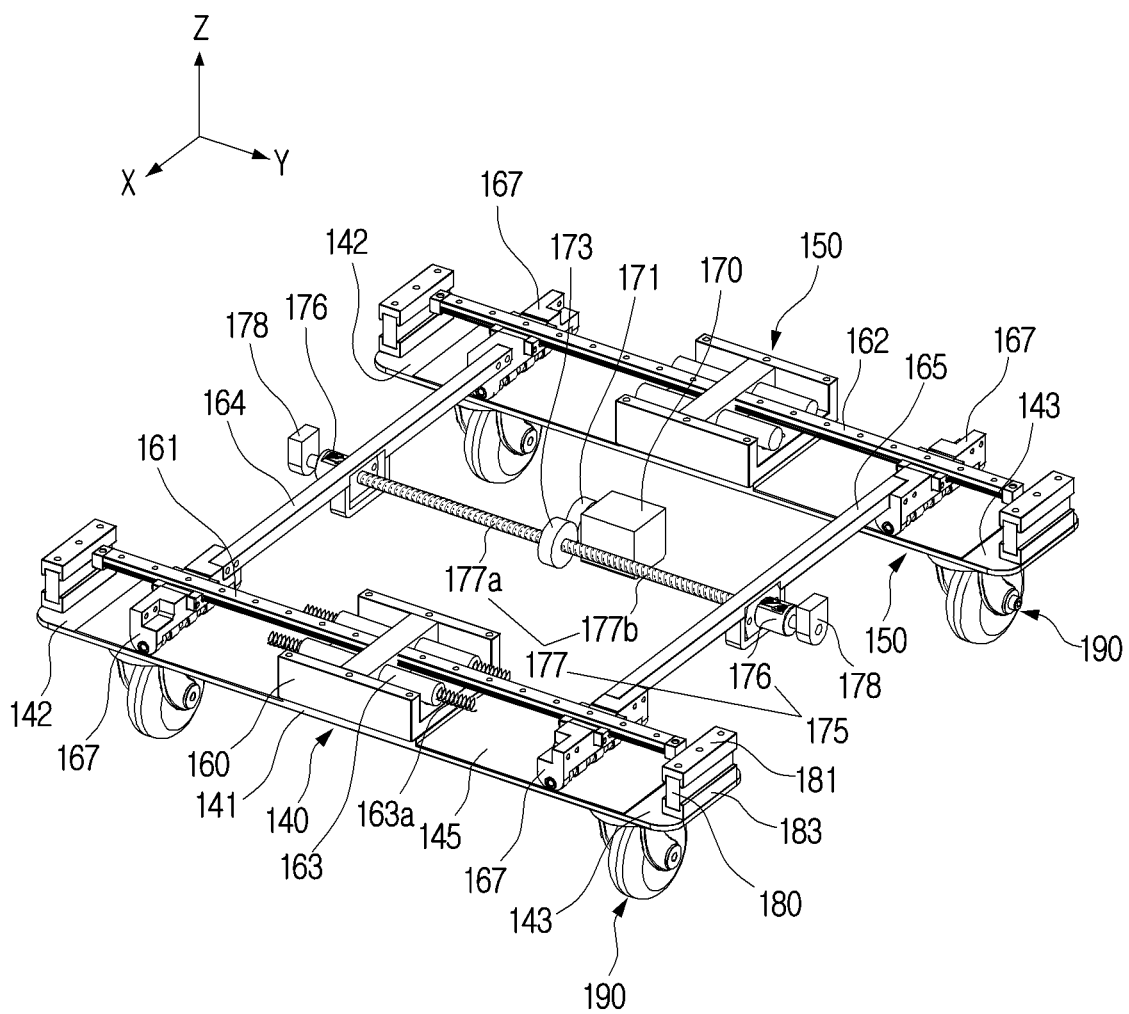
FIG. 4 is a diagram illustrating front and rear suspensions of a driving part.

FIG. 4 is a diagram illustrating front and rear suspensions of a driving part.

Referring to FIG. 4, the front suspension 140 and the rear suspension 150 may be arranged in parallel with each other at an interval in the front and rear directions (the X axis direction) of the driving part 100 on the lower side of the base plate 110. In this case, the front suspension 140 and the rear suspension 150 may respectively be arranged along the width direction (the Y axis direction) of the driving part 100. However, embodiments of the disclosure are not limited thereto, and the front suspension 140 and the rear suspension 150 may also be respectively arranged along the longitudinal direction (the X axis direction) of the driving part 100.

According to embodiments, the front suspension 140 and the rear suspension 150 may be constituted of the same structure. Accordingly, the structure of the front suspension 140 will be explained below, and the structure of the rear suspension 150 may be understood based on the explanation of the front suspension 140.

The front suspension 140 may be formed to have a specific length in approximately a straight line. To the upper surface of a center part 141, a fixing block 160 may be coupled, and a left cantilever portion 142 (e.g., a cantilever) and a right cantilever portion 143 (e.g., a cantilever) that respectively extend to the left side and the right side of the center part 141 may be formed.

The fixing block 160 connects the front suspension 140 to the lower side of the base plate 110. To the fixing block 160, a support 163 that supports a plurality of return springs 163*a* that respectively protrude to the left side and the right side may be coupled.

In case the motor 170 for varying the strength is not controlled by the at least one processor 21 when power is blocked, the plurality of return springs 163*a* may vary the strength of the front suspension 140 and the rear suspension 150 to approximately an intermediate degree. Operations of the plurality of return springs 163*a* will be explained in detail below.

The left cantilever portion 142 and the right cantilever portion 143 provided on the front suspension 140 may be symmetrically formed with the center part 141 at the center. Accordingly, the lengths of the left cantilever portion 142 and the right cantilever portion 143 may be formed to be identical to each other.

The left cantilever portion 142 and the right cantilever portion 143 may be formed in thin plate shapes. In this case, the left cantilever portion 142 and the right cantilever portion 143 may be each formed to have a thickness that is thinner than a thickness of the center part 141 of the front suspension 140. Also, the left cantilever portion 142 and the right cantilever portion 143 may be formed of a metallic material having a specific elastic modulus.

Figure 6:
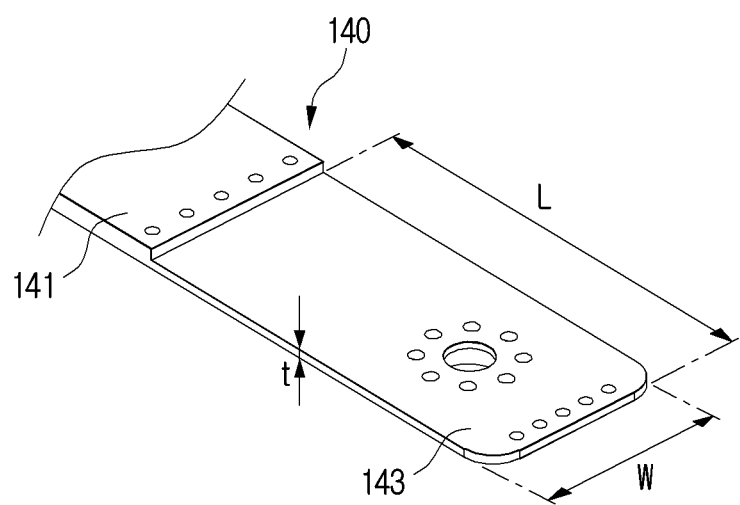
FIG. 6 is a diagram illustrating a cantilever portion of a suspension.
Figure 7:
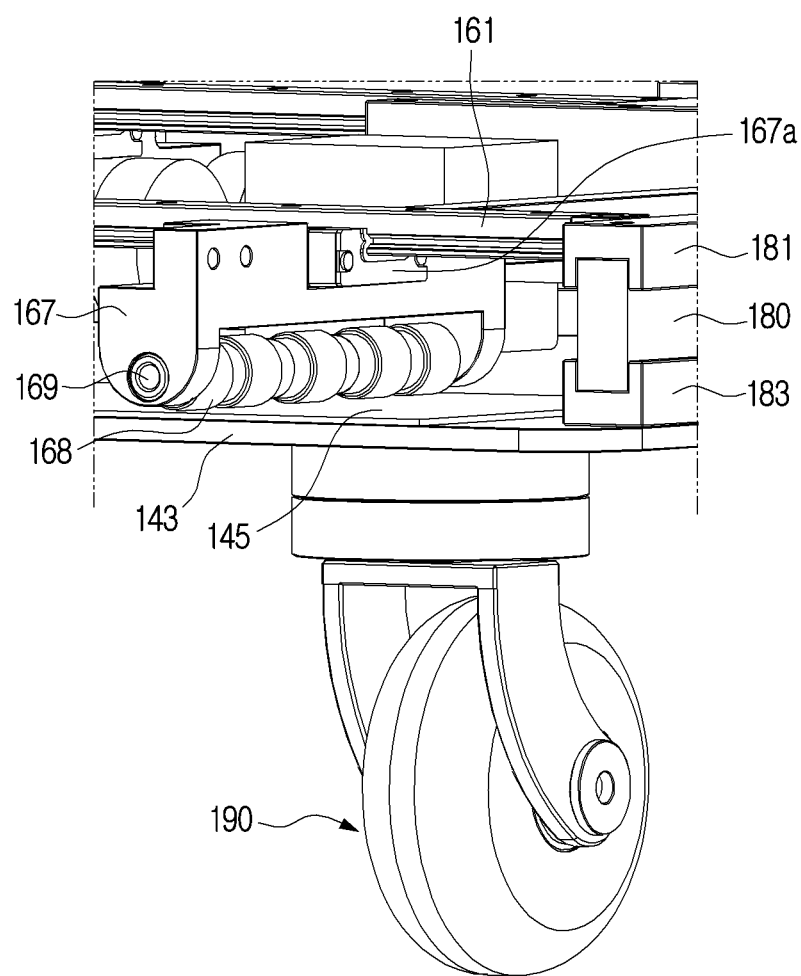
FIG. 7 is a diagram illustrating operating blocks, acting as supporting points of a cantilever portion of a suspension, and a plurality of rollers provided on the operating blocks.
Figure 8:
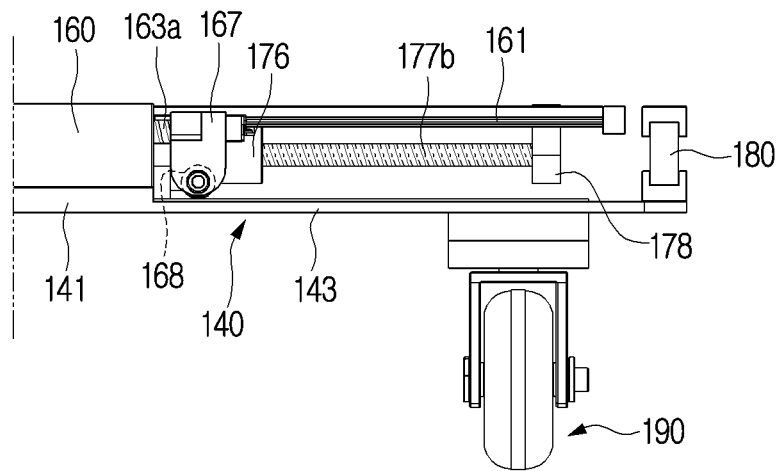
FIG. 8 is a diagram illustrating an example of varying the strength of a suspension by changing locations of supporting points.
Figure 9:
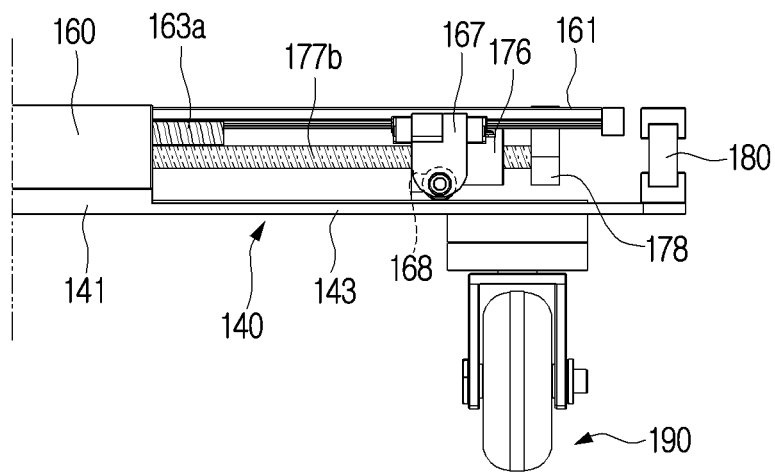
FIG. 9 is a diagram illustrating another example of varying the strength of a suspension by changing locations of supporting points.

FIG. 5 is a diagram illustrating an example wherein a caster of a driving part collides with a step formed on a driving surface during driving, FIG. 6 is a diagram illustrating a cantilever portion of a suspension, FIG. 7 is a diagram illustrating operating blocks, acting as supporting points of a cantilever portion of a suspension, and a plurality of rollers provided on the operating blocks, and FIG. 8 and FIG. 9 are diagrams illustrating examples of varying the strength of a suspension by changing locations of supporting points.

Referring to FIG. 5, in case one of the casters 190 trips on a step 12 formed on the driving surface 10 and receives shock while the driving robot device 1 is driving in a direction A, the shock may be transmitted in an approximately diagonal direction (a direction B) from the one of the casters 190 to the front suspension 140.

By such a shock, the left cantilever portion 142 and the right cantilever portion 143 take a specific motion. Such a motion means being bent in up and down directions with an operating block 167 that will be described below as a supporting point, and being twisted in a counter-clockwise direction with the axis following the longitudinal direction of the front suspension 140 (the Y axis in FIG. 4) as the center.

Referring to FIG. 6, the left cantilever portion 142 and the right cantilever portion 143 may be configured to have a width W, a thickness T, and a length L so that a motion in the same direction as the direction wherein shock is transmitted is performed smoothly, and may thereby effectively reduce shock transmitted to the front suspension 140 in a diagonal direction through one of the casters 190.

For each of the left cantilever portion 142 and the right cantilever portion 143, one of the casters 190 may respectively be arranged in a location adjacent to the end part of a lower surface of the cantilever portion, and a shock absorbing member 180 (e.g., a shock absorber) (refer to FIG. 7) may be arranged in a location adjacent to the end part of the upper surface of the cantilever portion.

A pair of the shock absorbing member 180 may be arranged between the left and right cantilever portions 142, 143 and the base plate 110. In this case, the upper and lower parts of each shock absorbing member 180 may be respectively fixed by an upper bracket 181 (refer to FIG. 7) coupled to the lower surface of the base plate 110, and a lower bracket 183 (refer to FIG. 7) coupled to the upper surface of a respective one from among the left cantilever portion 142 and the right cantilever portion 143.

Each shock absorbing member 180 may not only absorb vibration and shock transmitted through the left cantilever portion 142 and the right cantilever portion 143, but also play a role of a medium that connects the left cantilever portion 142 and the right cantilever portion 143 in a flowable state to the base plate 110.

Each shock absorbing member 180 may be formed of a rubber or urethane resin that has elasticity in itself. Alternatively, each shock absorbing member 180 may not be limited to a rubber or urethane damper, and an oil damper using flow resistance of liquid may be used.

Accordingly, the front suspension 140 and the rear suspension 150 and the plurality of the shock absorbing member 180 may absorb vibration and shock transmitted from the driving surface to the casters 190 while the driving part 100 is driving on the driving surface, and thereby block direct transmission of vibration and shock to the structure installed on the upper surface of the base plate 110.

The driving part 100 may pass along bumps, steps, etc. according to the form of the driving surface when driving. In this case, it would be advantageous for reducing vibration and shock if the strength of the front suspension 140 and the rear suspension 150 is low. However, in case the strength of the front suspension 140 and the rear suspension 150 is maintained to be low strength, the driving robot device 1 may be shaken severely in the front and rear directions of the driving robot device 1 due to inertia when the driving robot device 1 is accelerating or decelerating on the driving surface (e.g., a plane).

The driving robot device 1 according to an embodiment of the disclosure may vary the strength of the front suspension 140 and the rear suspension 150 in response to the driving environment, and may always move in a stable state. Varying of the strength of the front suspension 140 and the rear suspension 150 may be implemented by changing each supporting point of the left cantilever portion 142 and the right cantilever portion 143 respectively included in the suspensions.

Referring to FIG. 7, a supporting point wherein the left cantilever portion 142 and the right cantilever portion 143 are bent may be the operating block 167, or rollers 168 provided in the operating block 167.

To the upper part of the operating block 167, a linear motion (LM) block 167a that is slidably coupled to the first guide rail 161 may be coupled. Accordingly, the operating block 167 may move left and right along the first guide rail 161 by the LM block 167a.

To the lower part of the operating block 167, the plurality of rollers 168 may be rotatively coupled. The plurality of rollers 168 may be arranged in a row on the rotation axis 169 coupled to the operating block 167 along the longitudinal direction of the operating block 167.

At least one of the plurality of rollers 168 may be provided according to the widths of the left cantilever portion 142 and the right cantilever portion 143. For example, as the widths of the left cantilever portion 142 and the right cantilever portion 143 are wider, the number of the rollers 168 may be increased.

The plurality of rollers 168 may contact the upper surfaces of the left cantilever portion 142 and the right cantilever portion 143 in a rollable state. Accordingly, the operating block 167 may move to any one point smoothly on the left cantilever portion 142 and the right cantilever portion 143 by the plurality of rollers 168.

In this case, for minimizing noise that occurs when the plurality of rollers 168 move by rolling along the upper surfaces of the left cantilever portion 142 and the right cantilever portion 143, a sound absorbing sheet 145 may be attached to the upper surfaces of the left cantilever portion 142 and the right cantilever portion 143.

In the right cantilever portion 143, a section from one point on the right cantilever portion 143 wherein the operating block 167 or the plurality of rollers 168 are located (this location becomes the supporting point) to the end part of the right cantilever portion 143 may be bent or twisted. That is, the section from the supporting point of which location can vary to the end part of the right cantilever portion 143 performs the role of a cantilever. Also, in the case of the left cantilever portion 142, the section from the supporting point of which location can vary to the end part of the left cantilever portion 142 performs the role of a cantilever, in the same manner as the right cantilever portion 143.

For example, with reference to FIG. 8, as the operating block 167 proceeds more to a location adjacent to the center part 141, the strength of the front suspension 140 and the rear suspension 150 gradually decreases. This case means that sections that can be used as a cantilever increase among the entire sections of the left cantilever portion 142 and the right cantilever portion 143.

Also, with reference to FIG. 9, as the operating block 167 proceeds more to a location adjacent to the end part sides of the left cantilever portion 142 and the right cantilever portion 143 that are away from the center part 141, the strength of the front suspension 140 and the rear suspension 150 gradually increases. This case means that sections that can be used as a cantilever decrease among the entire sections of the left cantilever portion 142 and the right cantilever portion 143.

As described above, the driving robot device 1 according to an embodiment of the disclosure can drive stably by varying the strength of the front suspension 140 and the rear suspension 150 by moving the supporting points of the left cantilever portion 142 and the right cantilever portion 143 according to the state of the driving surface (e.g., bumps, steps, etc.) or the driving condition that the driving robot device 1 accelerates or decelerates, etc.

Also, in the driving robot device 1 according to an embodiment of the disclosure, the operating block 167 moves in a direction orthogonal to gravity for adjusting the strength of the left cantilever portion 142 and the right cantilever portion 143. Here, a plurality of the operating block 167 are not influenced by gravity when moving along the first guide rail 161 and the second guide rail 162. Accordingly, the plurality of the operating block 167 may move at a speed of several hundred ms to a set location on the left cantilever portion 142 and the right cantilever portion 143 by the motor 170 for varying the strength, and thus the strength of the left cantilever portion 142 and the right cantilever portion 143 can be swiftly changed.

Accordingly, the driving robot device 1 according to an embodiment of the disclosure can perform emergency driving by controlling the strength of the front suspension 140 and the rear suspension 150, and thus there is no need to include a separate device for emergency driving.

The driving part 100 of the driving robot device 1 according to an embodiment of the disclosure includes a structure for changing the location of the operating block 167, and explanation in this regard will be made with reference to FIG. 4.

Referring to FIG. 4, the first guide rail 161 to which two of the operating block 167 respectively corresponding to the left cantilever portion 142 and the right cantilever portion 143 of the front suspension 140 are slidably coupled may be fixed to the lower surface of the base plate 110. In this case, the first guide rail 161 may be arranged in parallel to the longitudinal direction of the front suspension 140.

Also, the second guide rail 162 to which two of the operating block 167 respectively corresponding to the left cantilever portion 142 and the right cantilever portion 143 of the rear suspension 150 are slidably coupled may be fixed to the lower surface of the base plate 110. In this case, the second guide rail 162 may be arranged in parallel to the longitudinal direction of the rear suspension 150.

The locations of the pair of the operating block 167 respectively corresponding to the left cantilever portion 142 and the right cantilever portion 143 of the front suspension 140 may be simultaneously changed as they move along the first guide rail 161. For example, the pair of the operating block 167 may simultaneously move in respective directions towards or away from each other.

Also, the locations of the pair of the operating block 167 respectively corresponding to the left cantilever portion 142 and the right cantilever portion 143 of the rear suspension 150 may be simultaneously changed as they move along the second guide rail 162. For example, the pair of operating blocks 167 may simultaneously move in respective directions towards or away from each other.

In this case, the two of the operating block 167 respectively corresponding to the respective left cantilever portion 142 of the front suspension 140 and the rear suspension 150 are coupled to both ends of a first connector 164. The first connector 164 may be arranged between the first guide rail 161 and the second guide rail 162, and may be arranged in an orthogonal direction with respect to the first guide rail 161 and the second guide rail 162. The first connector 164 may reciprocally move in a direction parallel to the first guide rail 161 and the second guide rail 162 together with the two of the operating block 167.

In addition, the two of the operating block 167 respectively corresponding to the respective right cantilever portion 143 of the front suspension 140 and the rear suspension 150 are coupled to both ends of a second connector 165. The second connector 165 may be arranged between the first guide rail 161 and the second guide rail 162, and may be arranged in an orthogonal direction with respect to the first guide rail 161 and the second guide rail 162. The second connector 165 may reciprocally move in a direction parallel to the first guide rail 161 and the second guide rail 162 together with the two of the operating block 167.

The first connector 164 and the second connector 165 may simultaneously move in respective directions towards or away from each based on driving of a ball screw 175. Accordingly, the four of the operating block 167 respectively connected to both ends of the first connector 164 and the second connector 165 may simultaneously be driven, and change the supporting points of the left cantilever portion 142 and the right cantilever portion 143 of the front suspension 140 and the rear suspension 150.

The ball screw 175 may include two moving nut parts 177 (e.g., a first moving nut part 177a and a second moving nut part 177b) respectively connected to the first connector 164 and the second connector 165, and one screw axis 176 to which the two moving nut parts 177 are respectively screw-coupled.

The screw axis 176 may be arranged in parallel to the first guide rail 161 and the second guide rail 162. Both ends of the screw axis 176 may be rotatively supported by a pair of axis brackets 178 fixed to the lower surface of the base plate 110.

To the center part of the screw axis 176, a driven gear 173 may be coupled. In the screw axis 176, screws in different directions may be formed in the left section and the right section based on the driven gear 173. For example, in the left section, a right screw may be formed, and in the right section, a left screw may be formed.

Accordingly, if the screw axis 176 rotates in one direction or in a reverse direction thereof, the two moving nut parts 177 simultaneously move in respective directions towards or away from each other.

The driven gear 173 may be gear-connected to a driving gear 171. The driving gear 171 may be coupled to the rotation axis of the motor 170 for varying the strength.

For the motor 170 for varying the strength, a servo motor that can rotate normally or rotate reversely may be used. The motor 170 for varying the strength may be fixed to the lower surface of the base plate 110 through a fastening hole (not shown).

According to embodiments, the time point of varying the strength of the front suspension 140 and the rear suspension 150 may be before passing over a bump or a step, and before the driving part 100 accelerates or decelerates.

For this, the driving robot device 1 according to an embodiment of the disclosure may control, by the at least one processor 21, the strength of the front suspension 140 and the rear suspension 150 based on mapping information with respect to the moving area of the driving robot device 1 stored in the memory 23.

The driving robot device 1 according to an embodiment of the disclosure may autonomously drive by the at least one processor 21. In this case, the at least one processor 21 may vary the locations of the plurality of the operating block 167 by controlling the motor 170 for varying the strength based on the mapping information during autonomous driving, and thereby appropriately vary the strength of the front suspension 140 and the rear suspension 150 according to the driving surface state.

Accordingly, the driving robot device 1 according to an embodiment of the disclosure may stably drive on a driving surface wherein bumps, steps, etc. exist. Also, the at least one processor 21 varies the strength of the front suspension 140 and the rear suspension 150 of the driving part 100 before accelerating or decelerating the speed of the driving robot device 1 that is driving, such that the center of gravity is on the center of the driving robot device 1 as far as possible, and therefore, stable driving is possible.

FIG. 10 is a diagram illustrating an example of a lookup table indicating the strength of a suspension in consideration of the driving surface state and whether food is loaded.

A mounting part 10 for the driving robot device 1 according to an embodiment of the disclosure to perform serving of food as in FIG. 1 may be installed on the base plate 110.

In the lookup table LT illustrated in FIG. 10, G0, G1, and G2 indicate states of driving surfaces. For example, G0 is a driving surface in a state wherein there are no bumps, and G1 and G2 are driving surfaces in a state wherein there are bumps. Here, G2 may be a driving surface in a state wherein more bumps than in G1 are formed. Information on such various driving surface states G0, G1, and G2 may be included in the mapping information.

Also, in the lookup table, K0, K1, and K2 indicate states of food placed on dishes. For example, K0 is a state wherein dishes, etc. are not housed in a rack, and thus the rack is emptied, and K1 and K2 are states wherein dishes on which food are placed, etc. are housed in racks. Here, K1 may mean that food in a solid state having a big size or coagulated with each other since the viscosity is high and that cannot be easily poured out of the dishes is included, and K2 may mean that food in a liquid form or consisting of small pieces not coagulated with each other and that can be easily poured out of the dishes is included.

The at least one processor 21 may control the driving speed of the motor 50 for driving such that the driving speed of the driving robot device 1 is controlled to be the fastest in a case wherein the state of food is K0 compared to cases wherein the states of food are K1 and K2. Also, the at least one processor 21 may control the driving speed of the motor 50 for driving such that the driving speed of the driving robot device 1 is controlled to be slower than when the state of food is K0 and to be faster than when the state of food is K2 in a case wherein the state of food is K1.

Further, the at least one processor 21 may control the driving of the motor 170 for varying the strength (e.g, rotate the driving axis of the motor 170 for varying the strength in a normal direction or in a reverse direction) based on each condition (e.g., K0-K2; G0-G2) displayed on the lookup table LT. In this case, as the locations of the plurality of the operating block 167 is changed by the driving of the motor 170 for varying the strength, the strength of the front suspension 140 and the rear suspension 150 may be adjusted.

Numbers corresponding to each condition (e.g., K0-K2; G0-G2) displayed on the lookup table LT are values converted to the locations of points wherein the plurality of the operating block 167 should be located on the left cantilever portion 142 and the right cantilever portion 143. For example, the number '60' corresponding to G1 and K2 among the conditions of the lookup table LT may indicate the distance from a first point (refer to FIG. 8) to a second point (refer to FIG. 9). The first point may refer to a spatial point where each of the plurality of the operating block 167 is arranged to be closest to the center part 141 (refer to FIG. 8), and the second point may refer to a spatial point where each of the plurality of the operating block 167 is arranged in a direction that extends away from the center part 141 (refer to FIG. 9). According to embodiments, the distance unit of the number '60' may be "mm."

Serving conditions input by a user through the input part 16 provided on the mounting part 10, e.g., the destination of serving of food and the kind of food (e.g., one of K0-K2) are stored in the memory 23.

The at least one processor 21 may move the driving robot device 1 along a driving path (e.g., a path from a departure of serving of food (e.g., the kitchen)) to a destination (e.g., the table of the ordering customer)) based on the mapping information.

For example, if the state of the driving surface that the driving robot device 1 should pass is G1, and the kind of food input by the user is K2, the at least one processor 21 may change the driving voltage applied to the motor 50 for driving such that the driving robot device 1 drives at a speed appropriate for the driving surface state G1 of the lookup table LT.

Along with this, the at least one processor 21 may change the strength of the front suspension 140 and the rear suspension 150 by driving the motor 170 for varying the strength based on a condition corresponding to the driving surface state G1 and the type of food K2 of the lookup table LT, and the point where each of the plurality of the operating block 167 is currently located. For example, if the current location of each of the plurality of the operating block 167 is the first point which is closest to the center part 141, the at least one processor 21 may control the rotating direction of the motor 170 for varying the strength so as to move the plurality of the operating block 167 as much as 60 mm in a direction away from the center part 141. Alternatively, if the current location of each of the plurality of the operating block 167 is a point that is distanced as much as 110 mm from the first point which is closest to the center part 141, the at least one processor 21 may control the rotating direction of the motor 170 for varying the strength so as to move the plurality of the operating block 167 as much as 50 mm in a direction toward the center part 141.

As described above, in embodiments of the disclosure, by varying the strength of the front suspension 140 and the rear suspension 150 based on a driving path included in the mapping information and the lookup table, the driving robot device 1 can be moved at an optimal speed to a destination of serving, and food can be transported stably.

Figure 11:
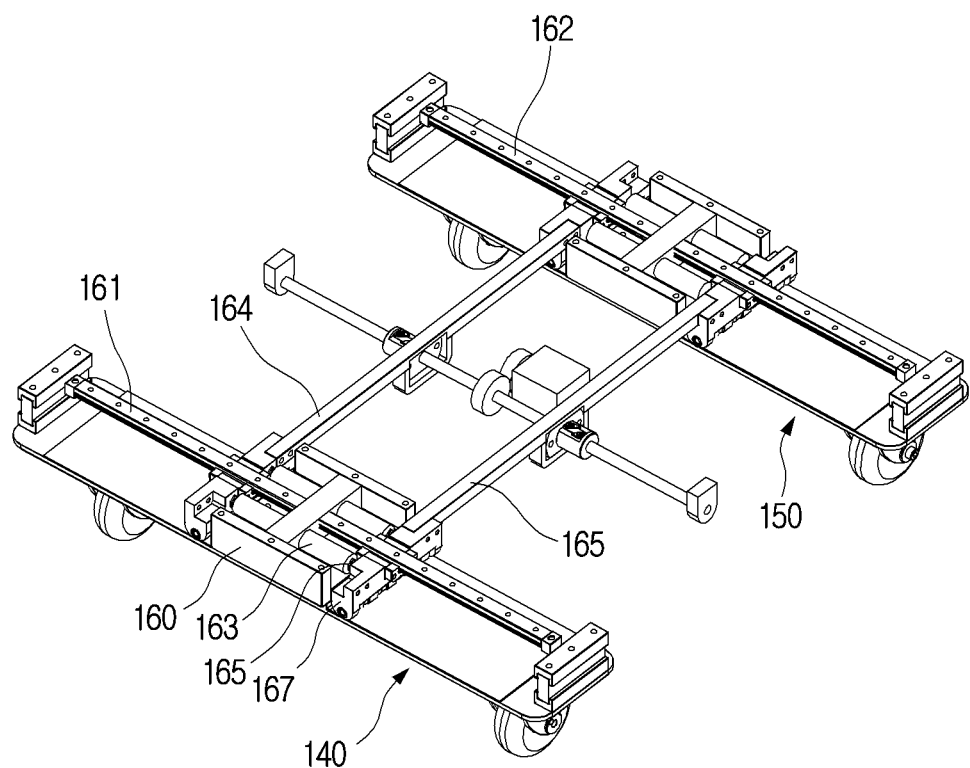
FIG. 11 is a diagram illustrating locations of operating blocks acting as supporting points of suspensions when the strength of the suspensions is in the smallest state.
Figure 12:
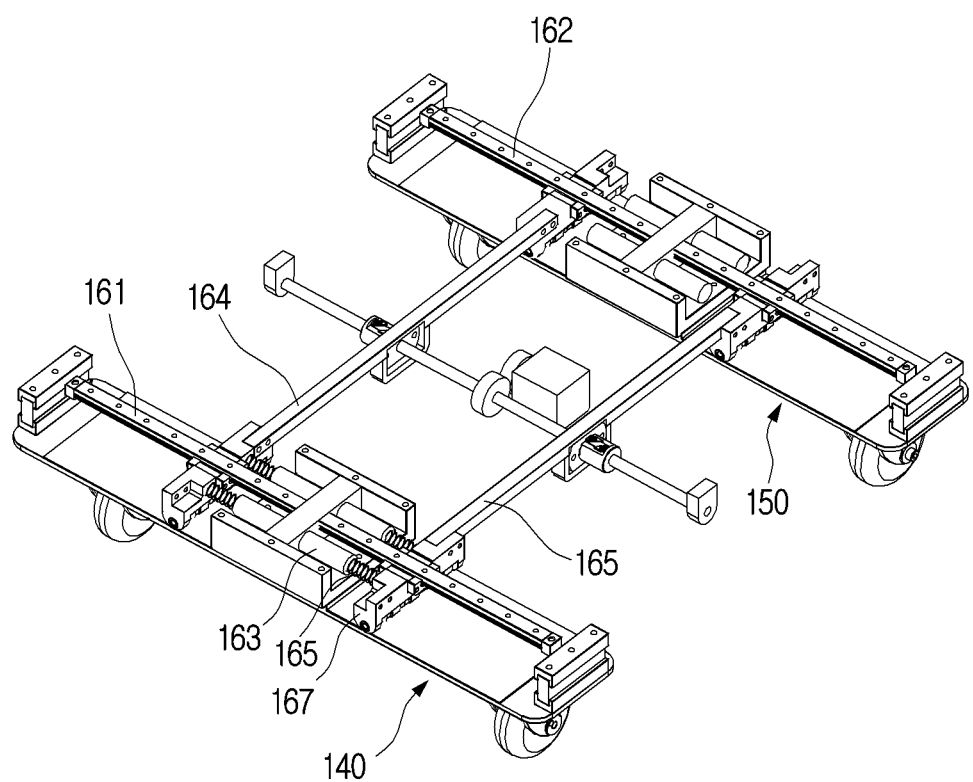
FIG. 12 is a diagram illustrating an example wherein locations of operating blocks acting as supporting points of suspensions were moved by a return spring such that the strength of the suspensions is maintained to be about an intermediate state when the power of a driving robot device is blocked.

FIG. 11 is a diagram illustrating locations of operating blocks acting as supporting points of suspensions when the strength of the suspensions is in the smallest state, and FIG. 12 is a diagram illustrating an example wherein locations of operating blocks acting as supporting points of suspensions were moved by a return spring such that the strength of the suspensions is maintained to be about an intermediate state when the power of a driving robot device is unintentionally blocked.

In case the plurality of the operating block 167 is in a state of being located to be closest to the fixing block 160 (refer to FIG. 4) as in FIG. 11, the strength of the front suspension 140 and the rear suspension 150 is in a state of being set to be the lowest.

In this case, the plurality of the operating block 167 may be in a state of having pressurized the return spring 163a to the side of the support 163, and having thereby compressed the return spring 163a to the maximum, and it may be a state wherein the biggest load was applied to the motor 170 for varying the strength.

If an emergency situation wherein the power of the driving robot device 1 is blocked by a malfunction or discharge of the battery occurs, the driving robot device 1 may be moved by a user by pushing.

However, if power is blocked in a state wherein the strength of the front suspension 140 and the rear suspension 150 is set to be the lowest as in FIG. 11, in the case of a driving surface wherein a lot of bumps are formed or in the case of having to pass over a step when the user is moving the driving robot device 1 by pushing, the driving robot device 1 may be shaken severely due to the shock transmitted through the casters 190. Due to such shaking, a dish housed in the rack may be detached from the rack, or food placed on the dish may be poured out.

If power is blocked in the state wherein the strength of the front suspension 140 and the rear suspension 150 is set to be the lowest as in FIG. 11, the return spring 163a may push out the plurality of the operating block 167 in a direction away from the fixing block 160 as in FIG. 12 by its own elastic force.

Accordingly, the strength of the front suspension 140 and the rear suspension 150 increases compared to the case illustrated in FIG. 11. In this case, according to the degree of the elastic force of the return spring 163a, the location of the plurality of the operating block 167 moved by being pushed out by the return spring 163a may be moved to a location closer to the end parts of the front suspension 140 and the rear suspension 150 than the location illustrated in FIG. 12, e.g., an approximate middle point of the left cantilever portion 142 and the right cantilever portion 143.

Accordingly, as the location of the plurality of the operating block 167 is moved by the return spring 163a after power is blocked, the strength of the front suspension 140 and the rear suspension 150 may be varied to an approximate intermediate degree. In this state, even if the driving robot device 1 passes along a driving surface wherein bumps are formed or passes over a step as the user pushes the driving robot device 1 directly, the driving robot device 1 is not shaken severely by the shock transmitted through the casters 190, and thus food can be served to the destination stably.

Hereinafter, a driving robot device according to another embodiment of the disclosure will be described with reference to FIG. 13 and FIG. 14.

Figure 13:
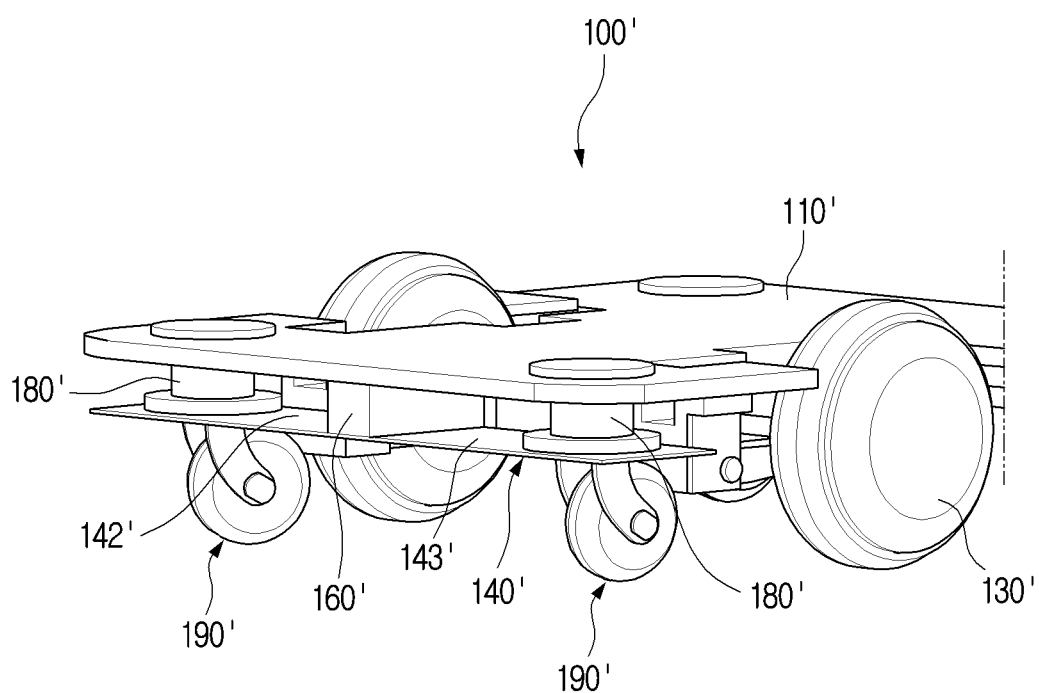
FIG. 13 is a diagram illustrating a driving robot device according to another embodiment of the disclosure.
Figure 14:
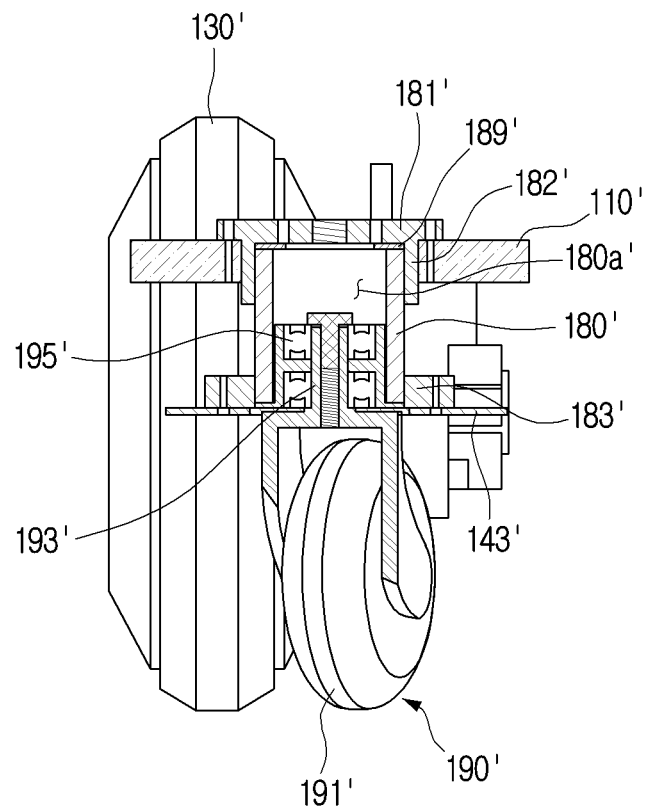
FIG. 14 is a diagram illustrating a cross-section of a part wherein shock absorbing members are installed of a driving robot device according to another embodiment of the disclosure.

FIG. 13 is a diagram illustrating a driving part of a driving robot device according to another embodiment of the disclosure, and FIG. 14 is a diagram illustrating a cross-section of a part wherein shock absorbing members are provided in the driving part of the driving robot device according to another embodiment of the disclosure.

Referring to FIG. 13, in the driving part 100' of the driving robot device according to another embodiment of the disclosure, the front suspension 140' and the rear suspension (not shown) may respectively be constituted as a cantilever form as the aforementioned driving part 100. In the driving part 100' of the driving robot device according to another embodiment of the disclosure, a component for varying the supporting points of the left cantilever portion 142' and the right cantilever portion 143' may be omitted.

In the driving part 100' of the driving robot device according to another embodiment of the disclosure, the front suspension 140' may be connected to the lower side of the base plate 110' through the fixing block 160'.

Also, the plurality of shock absorbing members 180' may respectively be arranged between the left cantilever portion 142' and the right cantilever portion 143' of the base plate 110.'

Also, similar to the driving part 100, the driving part 100' may include a pair of driving wheels 130' respectively arranged on the left side and the right side of the base plate 110'.

Referring to FIG. 14, the shock absorbing members 180' may be constituted as a barrel shape of which upper side and lower side are open, and wherein a space part 180a' (e.g., a space) is formed on the inner side.

A part of the upper part of the shock absorbing members 180' may be insert-fixed to the upper bracket 181', and a part of the lower part may be insert-fixed to the lower bracket 183'.

The upper bracket 181' may be coupled to the base plate 110', and the lower bracket 183' may be arranged on the same axis as the upper bracket 181' in the vertical direction, and it may be coupled to the right cantilever portion 143'.

For a housing 193' of the caster 190' that rotatively supports the wheel 191', the upper part of the housing 193' may pass through the right cantilever portion 143', and may be rotatively coupled to a bearing 195' arranged in the space part 180a' of the shock absorbing members 180'.

Between the upper bracket 181' and the upper end of the shock absorbing members 180', a thickness adjusting ring 189' in a form of a washer may be arranged.

In case the caster 190' arranged on the right cantilever portion 143' collides with a bump or a step formed on the driving surface while the driving part 100' is driving, and shock is transmitted to the front suspension 140', the right cantilever part 143' may absorb the shock as the right cantilever part 143' is bent. Here, some shock is transmitted to the shock absorbing members 180', but the shape of the shock absorbing members 180' may not be modified greatly.

In contrast, if the degree of the shock transmitted to the front suspension 140' is big, the right cantilever part 143' is bent, and at the same time, the shock absorbing members 180' are compressed in the vertical direction momentarily, and the center part of the shock absorbing members 180' is projectingly modified to the outer side of the shock absorbing members 180', and shock can be absorbed. The modified shock absorbing members 180' are restored to their original forms by their own elastic force, and thus the driving part 100' of the driving robot device can drive while maintaining the leveling, without being tilted to one side.

As described above, in the driving part 100' of the driving robot device according to another embodiment of the disclosure, the shock absorbing members 180' may complement the suspension function of the right cantilever portion 143'. Accordingly, the driving part 100' of the driving robot device may have a suspension function without adopting a separate structure for varying supporting points, and thus the overall structure can be simple, and the manufacturing cost can be reduced.

According to embodiments, the at least one processor 21 may be provided with memory storing computer instructions that are configured to cause the at least one processor 21 to perform its functions described herein. According to embodiments, the memory storing the computer instructions may be the same as or separate from the memory 23.

While non-limiting example embodiments of the disclosure have been shown and described, embodiments of the disclosure are not limited to the aforementioned example embodiments, and it is apparent that various modifications can be made by those having ordinary skill in the art to which the disclosure belongs, without departing from the gist of the disclosure, and such modifications may be within the scope of the descriptions of the claims.

What is claimed is:

1. A driving robot device comprising:
   a plurality of suspensions configured to absorb a shock applied by a driving surface on which the driving robot device drives;
   a first driving part that comprises a motor and is configured to adjust a strength of the plurality of suspensions; and
   at least one processor configured to control the first driving part to adjust the strength of the plurality of suspensions based on driving surface information with respect to a state of driving surface, and based on food information with respect to a state of food carried by the driving robot device,
   wherein the plurality of suspensions comprises a first suspension that comprises a center part and two side parts at opposite sides of the center part, respectively,
   wherein each of the two side parts comprises a cantilever,
   wherein the at least one processor is further configured to vary a supporting point of the cantilever of each of the two side parts of the first suspension by controlling driving of the first driving part,
   wherein the plurality of suspensions comprises the first suspension and a second suspension re provided on a lower side of a base plate of the driving robot device at an interval, and in parallel to each other,
   wherein the second suspension comprises ter part and two side parts at opposite sides of the center part of the second suspension, respectively,
   wherein the center part of the first suspension and the center part of the second suspension is fixed to the base plate,
   wherein each of the two side parts of the first suspension further comprise a caster provided on a lower surface of the cantilever of a respective one of the two side parts of the first suspension,
   wherein each of the two side parts of the second suspension comprises a cantilever and a caster provided on a lower surface of the cantilever of a respective one of the two side parts of the second suspension, and
   wherein the at least one processor is further configured to vary a supporting point of the cantilever of each of the two side parts of each of the first suspension and the second suspension by controlling driving of the first driving part.

2. The driving robot device of claim 1, wherein the at least one processor is further configured to:
   based on a state of the driving surface being determined as a plane, control the first driving part to adjust the strength of the plurality of suspensions to a first strength, and
   based on the state of the driving surface being determined as having at least one bump, control the first driving part to adjust the strength of the plurality of suspensions to a second strength that is lower than the first strength.

3. The driving robot device of claim 2, further comprising:
a plurality of driving wheels; and
a second driving part that comprises a motor and is configured to drive the plurality of driving wheels,
wherein the at least one processor is further configured to:
based on the state of the driving surface being determined as the plane, control the second driving part such that the driving robot device drives at a first speed, and
based on the state of the driving surface being determined as having the at least one bump, control the second driving part such that the driving robot device drives at a second speed that is slower than the first speed.

4. The driving robot device of claim 1, wherein the at least one processor is further configured to:
based on the state of the food being determined to have a first fluidity, control the first driving part to adjust the strength of the plurality of suspensions to a first strength, and
based on the state of the food being determined to have second fluidity that is higher than the first fluidity, control the first driving part to adjust the strength of the plurality of suspensions to a second strength that is lower than the first strength.

5. The driving robot device of claim 4, further comprising:
a plurality of driving wheels; and
a second driving part that comprises a motor and is configured to drive the plurality of driving wheels,
wherein the at least one processor is further configured to:
based on the state of the food being determined to have the first fluidity, control the second driving part such that the driving robot device drives at a first speed, and
based on the state of the food being determined to have the second fluidity, control the second driving part such that the driving robot device drives at a second speed that is slower than the first speed.

6. The driving robot device of claim 1, further comprising:
a memory storing mapping information with respect to an area wherein the driving robot device is configured to move,
wherein the at least one processor is further configured to determine the state of the driving surface based on the mapping information, and control the first driving part to adjust the strength of the plurality of suspensions based on the state of the driving surface.

7. The driving robot device of claim 1, further comprising:
a plurality of driving wheels; and
a second driving part that comprises a motor and is configured to drive the plurality of driving wheels,
wherein the at least one processor is further configured to:
determine the state of the driving surface, and
control the second driving part to adjust a driving speed of the driving robot device based on the state of the driving surface.

8. The driving robot device of claim 1, further comprising:
a sensor configured to detect the state of the driving surface,
wherein the at least one processor is further configured to control the first driving part to adjust the strength of the plurality of suspensions based on the state of the driving surface detected by the sensor.

9. The driving robot device of claim 8, wherein the sensor is a tilt sensor.

10. The driving robot device of claim 1, wherein the cantilever has a plate shape.

11. The driving robot device of claim 10, further comprising, for each of the first suspension and the second suspension:
a first operating block configured to move along a first longitudinal direction of the cantilever of a first side part from among the two side parts based on driving of the first driving part, and operate as the supporting point of the cantilever of the first side part while moving along the first longitudinal direction.

12. The driving robot device of claim 11, further comprising, for each of the first suspension and the second suspension:
a second operating block configured to move along a second longitudinal direction of the cantilever of a second side part from among the two side parts based on driving of the first driving part, and operate as the supporting point of the cantilever of the second side part while moving along the second longitudinal direction.

13. The driving robot device of claim 12, wherein the first driving part further comprises:
a first connector that connects the first operating block associated with the first suspension to the first operating block associated with the second suspension, wherein the first operating block associated with the first suspension and the first operating block associated with the second suspension are on a first side of the driving robot device;
a second connector that connects the second operating block associated with the first suspension to the second operating block associated with the second suspension, wherein the second operating block associated with the first suspension and the second operating block associated with the second suspension are on a second side of the driving robot device that is opposite to the first side, and the second connector is arranged in parallel to the first connector, and
wherein the first connector and the second connector are configured to vary locations of the first operating block, associated with the first suspension and with the second suspension, and the second operating block, associated with the first suspension and with the second suspension, by moving the first operating block, associated with the first suspension and with the second suspension, and the second operating block, associated with the first suspension and with the second suspension, in respective directions towards and away from each other based on driving of the motor.

14. A driving robot device comprising:
a base plate;
a pair of driving wheels respectively connected to a left side and a right side of the base plate;
a first suspension provided on a lower side of the base plate and comprising a first cantilever and a second cantilever at respective sides of the first suspension;
a second suspension provided at the lower side of the base plate and comprising a third cantilever and a fourth cantilever at respective sides of the second suspension;
a plurality of casters respectively provided on lower surfaces of the first suspension and the second suspension, to respectively correspond to the first cantilever, the second cantilever, the third cantilever, and the fourth cantilever;
a plurality of operating blocks configured to move along a longitudinal direction of the first cantilever, the second cantilever, the third cantilever, and the fourth cantilever, respectively, and operate as a supporting point of the first cantilever, the second cantilever, the third cantilever, and the fourth cantilever, respectively;

a driving part comprising a motor, the motor configured to move the plurality of operating blocks respectively and simultaneously along the longitudinal direction of the first cantilever, the second cantilever, the third cantilever, and the fourth cantilever;

a plurality of shock absorbers that are respectively provided between upper surfaces of the first suspension and the second suspension and a lower surface of the base plate, to respectively correspond to the first cantilever, the second cantilever, the third cantilever, and the fourth cantilever;

a memory storing mapping information including a driving surface state; and at least one processor configured to control the driving part to adjust a strength of the first suspension and the second suspension by varying the supporting point of the first cantilever, the second cantilever, the third cantilever, and the fourth cantilever, based on the mapping information.

15. A driving robot device comprising:

a first suspension comprising a first cantilever and a second cantilever at respective sides of the first suspension;

a second suspension comprising a third cantilever and a fourth cantilever at respective sides of the second suspension;

a plurality of operating blocks configured to move along a longitudinal direction of the first cantilever, the second cantilever, the third cantilever, and the fourth cantilever, respectively, and operate as a supporting point of the first cantilever, the second cantilever, the third cantilever, and the fourth cantilever, respectively; and a driving part comprising a motor, the motor configured to move the plurality of operating blocks respectively and simultaneously along the longitudinal direction of the first cantilever, the second cantilever, the third cantilever, and the fourth cantilever.

16. The driving robot device of claim 15, further comprising:

a memory storing mapping information including a state of a driving surface, and at least one processor configured to control the driving part to adjust a strength of the first suspension and the second suspension by varying the supporting point of the first cantilever, the second cantilever, the third cantilever, and the fourth cantilever based on the mapping information.

17. The driving robot device of claim 15, further comprising:

at least one processor configured to control the driving part to adjust a strength of the first suspension and the second suspension based on driving surface information with respect to a state of a driving surface in an environment of the driving robot device, and based on food information with respect to a state of food carried by the driving robot device.

18. The driving robot device of claim 17, wherein the at least one processor is further configured to:

based on the state of the driving surface being determined as a plane, control the driving part to adjust the strength of the first suspension and the second suspension to a first strength, and based on the state of the driving surface being determined as having at least one bump, control the driving part to adjust the strength of the first suspension and the second suspension to a second strength that is lower than the first strength.

19. The driving robot device of claim 15, wherein the driving part further comprises:

a first connector that connects a first operating block, from among the plurality of operating blocks, that is associated with the first suspension to a first operating block, from among the plurality of operating blocks, that is associated with the second suspension, wherein the first operating block associated with the first suspension and the first operating block associated with the second suspension are on a first side of the driving robot device;

a second connector that connects a second operating block, from among the plurality of operating blocks, that is associated with the first suspension to a second operating block, from among the plurality of operating blocks, that is associated with the second suspension, wherein the second operating block associated with the first suspension and the second operating block associated with the second suspension are on a second side of the driving robot device, opposite to the first side, and the second connector is arranged in parallel to the first connector, and wherein the first connector and the second connector are configured to vary locations of the first operating block, associated with the first suspension and with the second suspension, and the second operating block, associated with the first suspension and with the second suspension, by moving the first operating block, associated with the first suspension and with the second suspension, and the second operating block, associated with the first suspension and with the second suspension, in respective directions towards and away from each other based on driving of the motor.

* * * * *